Figure 1:
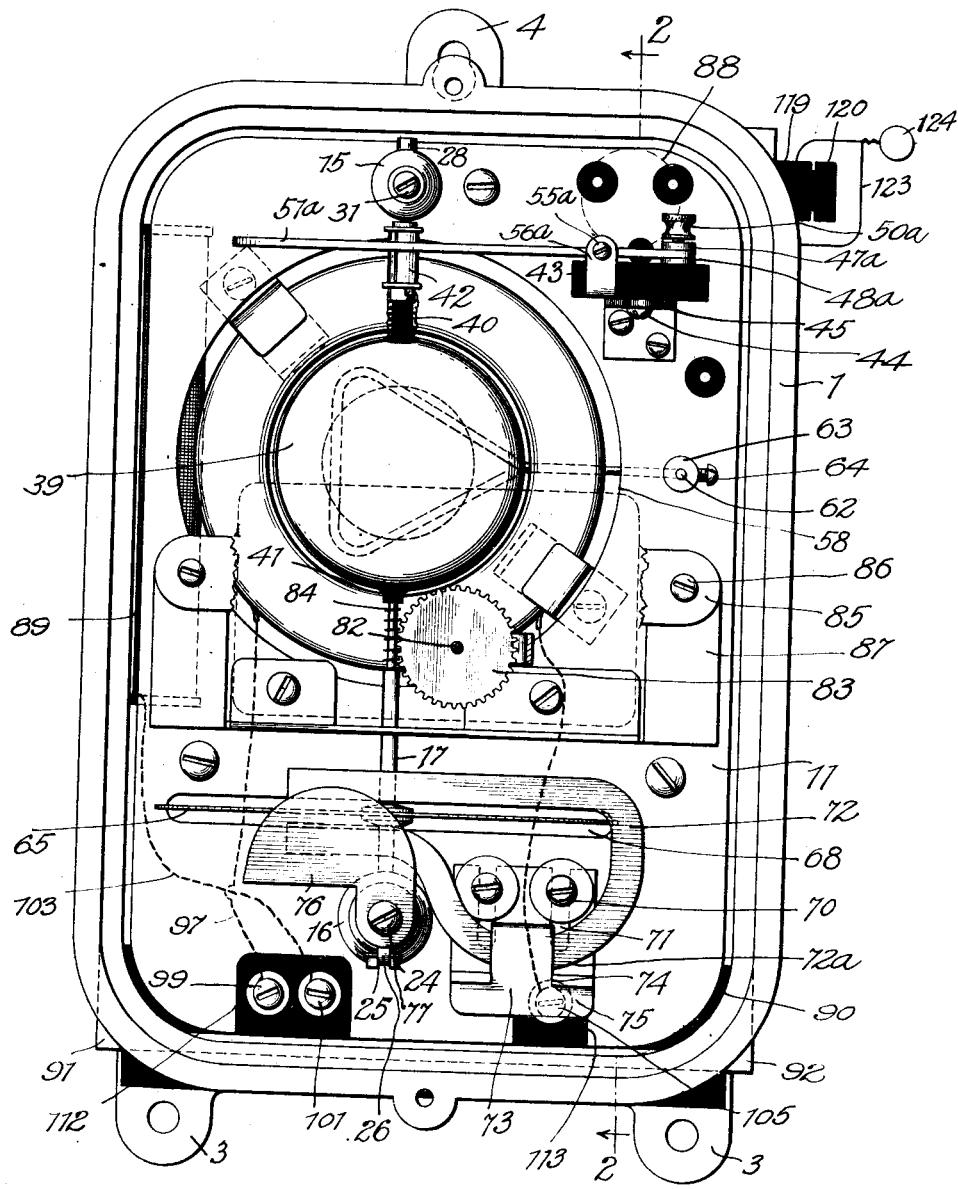

G. M. WILLIS.
ELECTRICITY METER.
APPLICATION FILED JAN. 10, 1908.

1,039,467.

Patented Sept. 24, 1912.

3 SHEETS—SHEET 1.

Witnesses:
Leonard W. Novander,
Charles J. Schmidt.

Inventor
George M. Willis
By Brown & Williams
Attorneys

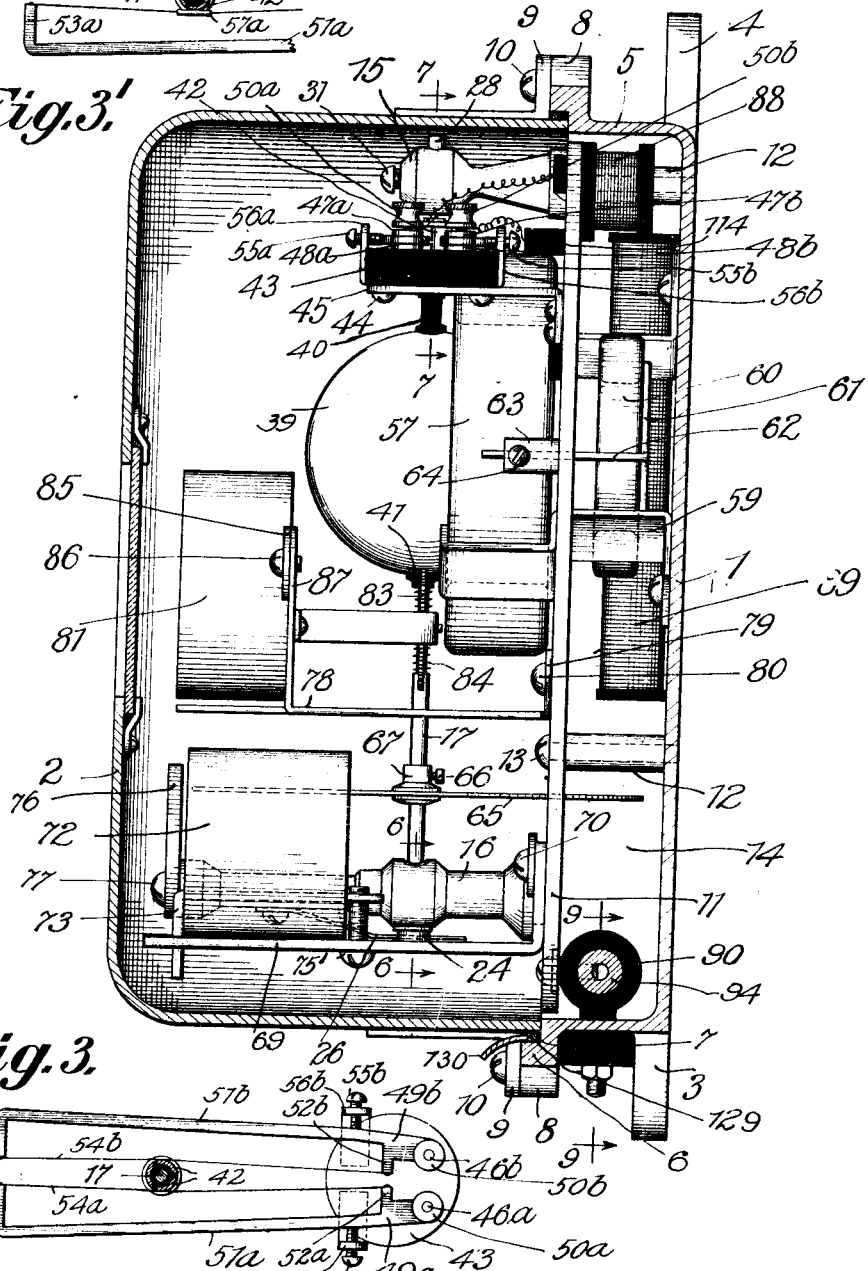

G. M. WILLIS.
ELECTRICITY METER.
APPLICATION FILED JAN. 10, 1908.
1,039,467.
Patented Sept. 24, 1912.
3 SHEETS—SHEET 3.
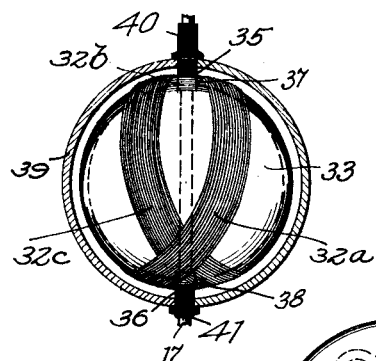
Fig. 5.
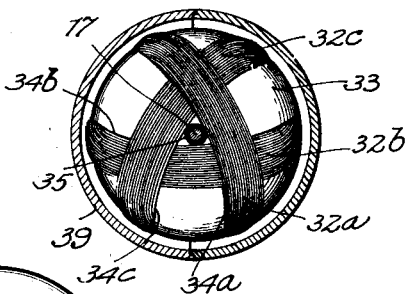
Fig. 4.
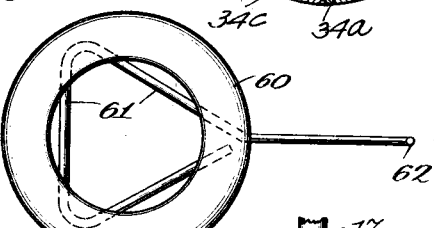
Fig. 8.
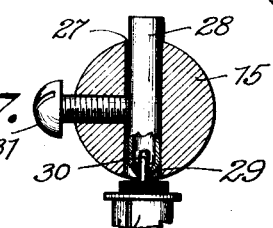
Fig. 7.
Fig. 6.
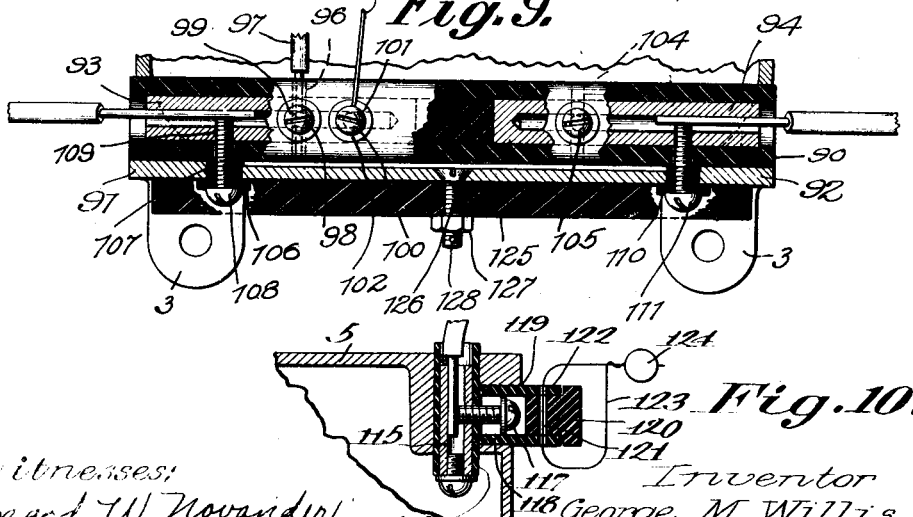
Fig. 9.
Fig. 10.
Witnesses:
Leonard W. Novander
Charles J. Schmidt
Inventor
George M. Willis
By Brown & Williams
Attorneys

UNITED STATES PATENT OFFICE.

GEORGE M. WILLIS, OF CHICAGO, ILLINOIS, ASSIGNOR TO WILLIS ELECTRIC METER COMPANY, OF CHICAGO, ILLINOIS, A CORPORATION OF ILLINOIS.

ELECTRICITY-METER.

1,039,467.  Specification of Letters Patent.  Patented Sept. 24, 1912.

Application filed January 10, 1908. Serial No. 410,185.

*To all whom it may concern:*

Be it known that I, GEORGE M. WILLIS, a citizen of the United States, residing at Chicago, in the county of Cook and State of Illinois, have invented a certain new and useful Improvement in Electricity-Meters, of which the following is a full, clear, concise, and exact description, reference being had to the accompanying drawings, forming a part of this specification.

My invention relates to wattmeters, its object being to produce an instrument of its kind which has a minimum number of parts formed and arranged to produce a light, compact structure and which is adaptable without any changes or rearranging and with equal efficiency for measuring both direct current and alternating current.

In meters of the prior art the movable members, particularly the armature, are large and bulky and the friction element is considerable. The torque producing parts, such as the field windings, must therefore be correspondingly large and heavy in order to produce the necessary driving torque, and all accessory electrical parts and the supporting frames must be correspondingly large and heavy, the result being a large, massive structure. The meter, on account of the size and weight of the torque-producing elements, also requires a great amount of energy or wattage for its operation. Also, on account of the size of the torque elements and the amount of windings necessary, the induction of the meter is considerable, which prevents the use of the meter for alternating current work unless the parts are rearranged and provision made for phase adjustment, frequency compensation, and so on. The great weight of the parts carried on the spindle causes a great amount of friction, and the matter of bearings is a very serious problem, the friction is not constant and some adjustment or compensating provision must be made, therefore. The commutator and brush mechanism on these prior meters, on account of the great amount of current required for operation, rapidly deteriorates. The least disturbance or jarring of the brushes or commutator will cause sparking, resulting in blackening or burning of the commutator and brushes, and the electrical conditions of the meter are therefore constantly varied.

The adjustment of meters of the prior art, therefore, is a very serious problem and an expensive one. The least derangement of the parts of these meters will necessitate recalibration.

One of the main objects of my invention is to reduce the size and weight of the armature structure to a minimum, thereby reducing to a minimum the weight of the supporting parts for the armature and the friction of the supporting parts in the bearings. Reduction in weight requires a less amount of winding on the armature, and the weight and size of the field coil and other torque-producing members can be correspondingly decreased. The amount of current consumption necessary for operating the meter is therefore reduced to a minimum and the sparking tendency reduced.

Another feature of my invention resides in the unique and extremely efficient construction and arrangement of the brush mechanism for the commutator, the arrangement being such that the worst shocks or jars to which the meter will be subjected in its normal capacity will have no effect and will cause no sparking or marking of the commutator or brush members.

Another feature of my invention resides in the compact and simple arrangement of the operative parts, the arrangement being such that each part is readily accessible. On account of the smallness of the operative parts and the compact arrangement thereof, the supporting framework and the inclosing case parts may be made very small and light. Provision is made for hermetically sealing the meter after calibration thereof, the meter being then absolutely dirt-proof and the duration of its efficiency greatly extended.

In the accompanying drawings the various parts and their relative arrangement are shown in detail, Figure 1 showing a front view of the meter with the case removed and parts being broken away to better show the construction; Fig. 2 is a side view from the right, the inclosing base being shown in section along line 2—2, Fig. 1; Fig. 3 is a top view of the brush gear and brush mechanism; Fig. 3' shows a modified 10 arrangement of brush mechanism; Fig. 4 is a top view of the armature, the outer inclosing shell being broken away to show the arrangement of the windings on the inner supporting shell; Fig. 5 is a side view of the armature, the outer inclosing shell being partly broken away; Fig. 6 is a sectional view through line 6—6, Fig. 2, showing the construction and arrangement of the lower armature bearing; Fig. 7 is a sectional view taken on line 7—7, Fig. 2, showing the arrangement and construction of the upper armature bearing; Fig. 8 is a top view of the starting coil and support therefor; Fig. 9 is a sectional view of the connection mechanism taken on line 9—9, Fig. 2; and Fig. 10 is a front view of the upper right corner of the meter casing with the supporting frame removed to show the method of finally sealing the meter.

The meter inclosing frame comprises the base part 1 and the cover 2. From the lower end of the base extend supporting lugs 3. From the upper end of the base extends a supporting lug 4. The edges of the walls 5 of the base part are engaged by the cover and the ends of these walls are surrounded by a flange 6 slightly larger than the cover to leave a sealing slot 7 when the cover is in place. From the upper and lower sections of the flange extend lugs 8 for registering with lugs 9 secured to the cover whereby said cover may be held in place, as by screws 10 passing through the lugs. Within the base is the supporting plate 11 mounted on posts 12 and held in position by screws 13 passing through these posts, the cover forming with the base and walls of the base member the compartment 14. Extending from the upper end of the supporting plate 11 is the upper bearing post 15 and extending from the lower end of the plate is the lower bearing post 16, these posts being suitably secured to the plate. Between these bearing posts extends the armature spindle 17. The construction and arrangement of the lower bearing within the lower bearing post 16 is shown in Fig. 6. Through the post extends the opening 18 lined by a sleeve 19. Extending into this sleeve from the bottom is the lower bearing plug 20 carrying in its end a bearing concave member 21. A similar bearing concave member 22 is secured in the lower end of the spindle 17 which extends into the upper end of the sleeve 19, and between these concave members is inserted a ball 23, which with the concave member forms a ball bearing for the armature spindle. This ball may be of steel and the concave members of stone, preferably agate, or the ball may be of agate and the concave members of steel. The head 24 of the bearing plug has a groove 25 which engages the end of a spring 26 whose other end is secured in some suitable manner to the frame. The lower bearing plug 20, which is slidably mounted in the sleeve 19, is thus yieldingly and flexibly supported, and injury to the bearing from jars or jolts is prevented. The arrangement in the upper bearing post 15 is shown in Fig. 7, the bearing post having the opening 27 in which is the hollow rod 28 having the bearing opening 29 in its lower end for receiving the upper or pointed pin end 30 of the spindle, this rod 28 being adjustable and locked by set screw 31. By loosening this set screw and raising the rod 28 clear of the spindle, the spindle with the parts thereon may be removed from the bearings. Mounted on the spindle near the upper end thereof is the armature which is of novel construction, as shown in Figs. 4 and 5. The windings of the armature are arranged in three coils, 32$^a$, 32$^b$ and 32$^c$, arranged 120 degrees apart and extending obliquely across the spindle, as shown. These windings are supported on an inner shell 33 of light material, and this shell is provided with grooves 34$^a$, 34$^b$ and 34$^c$ encircling the shell in planes 120 degrees apart and passing obliquely through the spindle. This inner shell may be stamped from light sheet material, such as aluminum, or may be formed of some other composition. I have used celluloid to great advantage. This inner shell is held in place on the spindle by sleeves 35 and 36 which slip over the spindle into diametrically opposite openings 37 and 38 in the shell, and these thimbles may be held to the spindle by friction or by being glued or otherwise secured thereto. To protect the windings the outer shell 39 is provided which may also be of light sheet material, such as aluminum, or which may also be of celluloid or other composition, this outer shell being formed in halves which are applied about the windings and inner shell and their edges cemented together. This outer shell may also be secured to the spindle by sleeves 40 and 41 in the same manner as the inner shell is secured. Thus, the armature windings are given a firm support and are thoroughly protected against dirt or injury. The supporting shell and the inclosing shell may be made extremely light, and therefore the combined weight of the armature can be made very little indeed. The armature being thus very light, the spindle can be very light and there will be very little weight on the lower bearing. The armature coils have their terminals connected together in common, the other terminals of the coils passing upwardly through suitable openings in the outer shell to connect with the commutator segments 42 suitably secured to the spindle. As the armature coils cross each other, the grooves in the inner shell, which is spherical, are made of varying depths so that the surface of the armature will be spherical. Care must also be taken to so proportion the windings that the coils will have the same magnetic value to cause the armature movement to be uniform and not jerky. The coils are therefore so wound that the product of the number of turns per coil and the average area inclosed by the coil turns is constant.

The brush mechanism is supported from a mounting block 43 which may be of hard rubber, fiber, lava or any other suitable material, which block is secured in horizontal position by screws 44 to a bracket 45 secured to and extending from the supporting plate 11. Threaded studs 46$^a$ and 46$^b$ extend upwardly from the block 43 and are engaged by threaded washers 47$^a$, 48$^a$ and 47$^b$, 48$^b$, respectively. Between the washers 47$^a$ and 48$^a$ is clamped one end of the brush frame 49$^a$, while between the washers 47$^b$ and 48$^b$ is clamped one end of the brush frame 49$^b$. The upper ends of the studs are engaged by terminal thumb screws 50$^a$ and 50$^b$ for connecting the brush frames in circuit. The brush frames are similar and in the form of bows. The bow or brush frame 49$^a$ is formed by the rod 51$^a$ and the extensions 52$^a$ and 53$^a$ at opposite ends of this rod. Stretched across these projections and screwed thereto is a strand 54$^a$ of conducting material, preferably in the form of wire of a copper and nickel alloy. The bow part for the brush frame 49$^b$ is of similar construction, the corresponding parts being given the additional character $b$. The strands 54$^a$ and 54$^b$ may engage directly with the commutator segments at diametrically opposite points, and these commutator segments may also be of the same material as the strands. The bearing tension of the brushes 54$^a$ and 54$^b$ against the commutator can be adjusted by set screws 55$^a$ and 55$^b$, respectively, which are mounted in metallic supports 56$^a$ and 56$^b$ secured to the block 43. The brush frames after adjustment are locked by the washers 47 and 48. I find that these brushes in the form of long strands of wire will take up any and all vibrations and jars to which the meter will be subjected during use, and as the brushes can never leave or become disengaged from the commutator, there can be no sparking and the circuit conditions so far as the commutator brush mechanism is concerned, will always remain constant. This copper-nickel alloy will maintain a bright surface and will not tarnish and blacken as will gold, silver, platinum or other metals or compositions used in meters of the prior art. I do not wish to be limited, of course, to this compound for the brushes and commutator segments, as these parts can be formed of any other material, the success of the mechanism as a spark preventive depending mainly upon the construction shown, namely, the long wire strand forming the brush and supported from the bow-like frames.

Adjustment being once established by the set screws 55 the brush frames can be removed from the studs 46 and when replaced against the set screws 55 the adjustment of the meter is restored and there is no need of recalibration. In a great many meters of the prior art recalibration was necessary nearly every time the brush mechanism was removed or in any way disturbed, and this recalibration was necessary even after a term of operation of the meter on account of blackening or burning of the commutator and brushes caused by sparking. Instead of having the brush wires engage directly with the commutator, they could, of course, be provided with sleeves 57$^a$ and 57$^b$, respectively, at the point of engagement with the commutator, this modified arrangement being shown in Fig. 3'.

The main torque-producing or field coil 57 is circular and surrounds the rear half of the armature. The supporting plate 11 has the opening 58 to the rear of, and of larger diameter than, the field coil and supporting clamps 59 secured to the base 1 extend through this opening and about the field coil to hold said coil in vertical position about the armature. To the rear of the armature and in the compartment 14 is the circular starting coil 60, this starting coil, as best shown in Fig. 8, being secured to the corners of a triangular wire frame 61 whose end 62 extends forwardly through a lug or sleeve 63 on the supporting plate 11 to be secured in said sleeve by the set screw 64. The supporting frame 61 can thus be swung about the rod 62 and can be moved horizontally so that the starting coil can be moved toward or away from the armature or swung vertically, thus providing for very close adjustment and this adjustment can very readily be made without disturbing any of the meter parts. The supporting means 61 is also very light. At the lower end of the armature spindle is the damping disk 65 secured thereto by screw 66 passing through hub 67, this disk extending through slot 68 in the supporting plate 11. An L-shaped bracket 69 is secured to the supporting plate 11 by screws 70 passing through slots 71 in the base of the bracket. At the end of this bracket or shelf 69 is mounted a damping magnet 72 with its poles spanning the damping disk. This magnet is held in place by the L-shaped toggle frame 73 whose vertical part passes through a slot 74 cut in the front end of shelf 69 and whose head 75 engages below the shelf, the horizontal part 74 of the clamping frame passing over the magnet bar to be engaged at its end by a screw 75' which passes upwardly through an opening in the shelf 69 and into threaded engagement at its end with the clamping frame. Tightening of the screw securely locks the magnet to the shelf 69 and to remove said magnet the screw 75′ is withdrawn, whereupon clamping frame 73 is withdrawn and the magnet can be removed. The magnet can be vertically adjusted by means of the screws 70 in slots 71. The section 72ª of the magnet engaged by the clamping member 73 is also rounded, which allows further adjustment of the magnet poles. The damping effect of the magnet on the disk may be controlled by a shunting plate 76 of semi-circular form secured eccentrically to the extending end of lower bearing post 16 by means of screw 77. By means of this plate 76 the magnetic flux between the magnet poles may be more or less shunted to thereby adjust the damping or retarding effect of the magnet on the disk.

To prevent demagnetization of the permanent magnet a magnetic shield or frame 78 is mounted between the magnet and the armature and field coil, this magnetic shield being secured to the supporting plate 11 by lugs 79 and screws 80. This shield serves also for supporting the recording mechanism 81 which may be of any construction and from which a driving shaft 82 extends supporting at its end a gear 83 for meshing with the worm threads 84 on the spindle. Lugs 85 extending from this recording mechanism are secured by screws 86 to the upward extensions 87 from the plate 78.

At the upper end of the meter, within the compartment 14, is suitably secured a non-inductively wound shunt coil 88 whose terminals are connected with studs 46ª, 46ᵇ by means of the clamping nuts 50ª, 50ᵇ, and thus the commutator brushes are shunted. Also secured within the compartment 14 is a non-inductively wound resistance coil 89. At the lower end of the compartment 14 a sleeve 90 of fiber or other suitable insulating material extends entirely across the meter frame, and supported in lugs 91, 92 at opposite sides of the meter frame. The contact arrangement within this sleeve is shown in Fig. 9. Extending into the left end of the sleeve is a brass tube 93, and extending into the right end of the sleeve is a brass tube 94, the inner ends of the tubes being insulated by the partition or block within the tube. Through the walls of tube 93 is a contact opening 96 for receiving the end of terminal 97 of the field coil, and through the wall of tube 93 at right angles to the opening 96 is a threaded opening 98 for receiving the clamping screw 99 for clamping terminal 97 to the terminal tube. Adjacent the opening 98 is another threaded opening 100 for receiving screw 101, and at the outside of the insulating sleeve 90 is a washer 102 between which and the screw 101 may be clamped one terminal 103 of the resistance coil 89. Sleeve 94 has contact passageway 104 and a clamping screw 105 for connecting the other terminal of the field coil to the terminal tube 94. At the left end of the lower wall 5 of the base part a bushing 106 of suitable insulating material passes through the opening 107, and through this bushing passes a screw 108 through the threaded hole 109 in the terminal tube 93 for clamping in the end of said tube one terminal of the main circuit. Likewise at the right lower corner of the meter base there is a bushing 110 for receiving the binding screw 111 by means of which the other main line terminal may be connected with the contact tube 94. The lower edge of the supporting plate 11 is cut away to leave the openings 112 and 113 through which extend the binding screws 99, 101, 105, respectively. The other terminal of the resistance winding connects with one terminal of the starting coil 60 whose other terminal connects through insulating sleeve 114 with one of the brush studs, while the other brush stud connects with a terminal sleeve 115 at the upper right corner of the meter frame, as shown in Fig. 10. This sleeve is within a suitable insulating shell 116 which extends through the meter frame wall so that a terminal can be inserted in said sleeve to be clamped thereto by a binding screw 117 which passes to the exterior through opening 118 in the meter frame wall. This opening is lined by a fiber sleeve 119 whose end is adapted to be engaged by a plug cap 120 having an opening 121 through its plug part registering with openings 122 in the sleeve 119 so that a sealing wire 123 may be passed through these openings to make it impossible to connect or disconnect the terminal with sleeve 115 without cutting the sealing wire or disturbing the seal 124 connecting together the ends of the sealing wire. The sleeve 115 forms one terminal of the pressure circuit whose other terminal has been described as connecting with contact screw 101. Sealing means is also provided for the main terminals in the form of a block 125 which is secured against the lower side of the base by a screw 126 extending from the base and a nut 127. Through the end of the screw is an opening 128 for receiving a sealing wire.

The sealing slot 7 between the cover and frame has already been referred to. After the cover is placed in position against the base part and the screws 10 secured, a cord 129 is inserted in the groove 7 and against the base thereof and sealing material in some form of wax is heated and filled in the slot above the cord, one end 130 of the cord being left without the slot, as shown in Fig. 2. The meter is thus hermetically sealed and there will be no tendency to open the meter and tamper therewith. If the meter, however, is to be repaired or calibrated the sealing material is easily removed by grasping the extending end of the cord and drawing the cord with the sealing material thereover out of the slot. When the meter therefore is shipped from the factory or from stock it is sealed. When the meter is to be installed, the sealing block 125 is removed, the series connection with the main line made, the sealing block replaced and the seal wire applied. The terminal of the pressure wire is then inserted into sleeve 115 and secured by means of screw 117, the plug 120 being then inserted and the sealing wire 123 applied. This sealing of the terminals has a tendency to prevent a great deal of tampering with the meter, and in most cases such tampering can be detected.

The pressure circuit through the meter includes the resistance 89, the starting coil 60, one of the brushes, the armature, the other brush, the sleeve 115 and the external terminal. The shunt coil 88, whose resistance is less than that of the armature, shunts the armature when the brushes are in engagement with the commutator and assists in preventing sparking at the brushes. The fine wire brushes are the weakest part of the pressure circuit and upon excessive current flow, will act as fuses to thus protect the armature windings. The resistance and the shunt coil are non-inductively wound, and are therefore free from induction. The armature windings being very few in number, their induction will be very small and the sum total induction of the meter can be made so small that the meter may be used with equal efficiency on either direct current or alternating current independent of the phase relations, frequency or other characteristics and without in any way changing the adjustment of the meter or rearranging its parts, and without the addition of any compensating or adjusting parts. In other words, the meter of my invention can be used practically universally for direct current work or for alternating current work and its reading will always be correct, this being a very important feature.

The meter parts, besides being very simple, are arranged to be readily accessible so that adjustments can easily and quickly be made and so that parts may be removed without disturbing others. The single field coil being entirely to the rear of the spindle, the armature structure can be readily removed straight from the front of the meter. The arrangement of the armature windings as described enables me to produce, with the single field coil placed as shown, a torque which will cause entirely smooth and uniform rotation of the armature.

Having thus described my invention, I desire to secure the following claims:—

1. In an electricity meter, the combination of field-producing means, an armature subjected to the influence of said means, windings for said armature, a support for the windings, and a hollow inclosing shell of insulating material forming part of the armature structure and entirely inclosing the support and windings.

2. In an electricity meter, the combination of field-producing means, an armature subjected to the influence of said means, and a spherical protective shell entirely inclosing the armature and adapted to move therewith.

3. In an electricity meter, the combination of field-producing means, an armature subjected to the influence of said means to be rotated, windings for said armature, an inner spherical shell supporting said windings, and a spherical outer protective shell entirely inclosing the windings and forming part of the rotatable armature structure.

4. In an electricity meter, the combination of field-producing means, a rotatable armature structure, windings for said armature structure subjected to the influence of said means, a thin spherical shell on which said windings are mounted, and a thin protecting spherical shell entirely surrounding the windings and forming part of the armature structure, said inclosing shell being in two halves which are secured together after application about the windings.

5. In an electricity meter, the combination of field-producing means, a rotatable armature spindle, a thin spherical supporting shell mounted axially on said spindle, armature windings supported on said spherical shell and subjected to the influence of said field-producing means, and an outer spherical protecting shell mounted on said spindle and inclosing the windings and the supporting shell.

6. In an electricity meter, the combination of field-producing means, armature windings subjected to the influence of said means, an inner shell on which said armature windings are mounted, and an outer protecting and insulating shell entirely surrounding and inclosing the armature windings and inner shell.

7. In an electricity meter, the combination of field-producing means, a rotatable vertical armature spindle, a spherical shell mounted axially on said spindle, said shell having three circumferential grooves displaced 120 degrees apart and each surrounding the spindle, armature windings arranged in said grooves and subjected to the influence of said field-producing means, and a separate outer protecting shell mounted on said spindle and entirely inclosing said supporting shell and windings thereon.

8. An armature for an electricity meter, comprising a core, and a plurality of coils of different internal area, a larger one of such coils having proportionately fewer turns than a smaller one of such coils.

9. In an electricity meter, the combination of field producing means, a supporting shell, and armature windings in the form of coils of different internal area surrounding said shell in diametral planes extending obliquely across an axis of said shell, a larger one of such coils having proportionately fewer turns than a smaller one of such coils.

10. An armature for electric meters composed of a number of coils of different internal area arranged to cross one another and also to obliquely cross the armature shaft, a larger one of such coils having proportionately fewer turns than a smaller one of such coils.

11. In an electricity meter, the combination of a vertical supporting frame, an upper guide post extending from said frame, a lower guide post extending from said frame, a bearing in each post, an armature spindle supported in said bearings, a retarding disk carried by the spindle, a damping magnet supported from the frame and spanning the disk, and a magnetic member carried by the lower post and adapted to be adjusted to control the magnetic effect of said damping magnet on said disk.

12. In an electricity meter, the combination of a vertical supporting frame, an upper guide post extending from said frame, a lower guide post extending from said frame, a bearing in each post, an armature spindle supported in said bearings, a retarding disk carried by the spindle, a damping magnet supported from the frame and spanning the disk, and a magnetic plate pivoted at the end of the lower bearing post adjacent the poles of the damping magnet, said plate being rotatable to short-circuit more or less of the magnetic flow between the poles of the damping magnet, thereby adjusting the damping effect of the magnet on the disk.

13. In an electricity meter, the combination of a supporting frame, bearing posts extending from said frame, an armature spindle bearing in said posts, a damping disk carried by the spindle, a damping magnet supported from the frame and spanning the disk, and a plate of magnetic material pivoted eccentrically adjacent the poles of said magnet and adjustable to overlap more or less of said poles to thereby short-circuit more or less of the magnetic flow.

14. In an electricity meter, the combination of a supporting frame, extensions on said frame, bearings supported by said extensions, an armature spindle pivoted in said bearings, a damping disk carried by the spindle, a damping magnet spanning said disk, an L-shaped frame having its one limb adjustably secured to the frame and supporting the magnet on its other limb, and a clamping plate passing through said electromagnet, one end of said clamping plate engaging said other limb and its other end adjustably secured to said other limb.

15. In an electricity meter, the combination of field-producing means, an armature spindle, a supporting core carried by the spindle, windings applied to said core to be subjected to the influence of said field, and an inclosing shell surrounding the windings and carried by the spindle, said inclosing shell being formed of sections secured together.

16. In an electricity meter, the combination of field-producing means, an armature spindle, a spherical supporting core carried by the spindle, windings on said core subjected to the influence of said field-producing means, and a spherical inclosing shell carried by the spindle and surrounding said windings, said shell being of two semispherical halves secured together at their edges.

17. In an electricity meter, the combination of an armature spindle, a spherical supporting shell on the spindle, bushings engaging the spindle and said shell for holding said shell in place on said spindle, windings applied to the shell, and an outer spherical inclosing shell supported by said bushings, said outer shell being composed of two halves secured together at their edges.

18. In an electricity meter, the combination of an armature spindle, a spherical shell on the spindle, bushings on the spindle for confining said inner shell on the spindle, windings on said shell, and a spherical inclosing shell carried by said bushings, said inclosing shell being separated from said windings by an air space.

19. In an electricity meter, the combination of an armature spindle, a core on said spindle, windings on said core, and a shell secured to the spindle by said bushings, there being an air space between said shell and the windings.

20. In an electricity meter, the combination of an armature spindle, a core on said spindle, windings applied to said core, and a celluloid shell carried by the spindle and inclosing said windings.

21. In an electricity meter, the combination of an armature spindle, a core on said spindle, windings applied to said core, and a celluloid shell carried by the spindle and inclosing said windings, there being an air space between said shell and said windings.

22. In an electricity meter, the combination of a rotatable shaft, torque-producing means for causing rotation of said shaft, a retarding disk on said shaft, a retarding magnet spanning said disk, and rotatably adjustable means at one side of the magnet for shunting about the disk more or less of the magnetic flow between the poles of the magnet.

23. In an electricity meter, the combination of a supporting frame, electrical mechanism within the frame, a terminal sleeve extending through said frame for connection with said electrical mechanism, a clamping screw engaging said sleeve, an insulating sleeve for accommodating said clamping screw, said insulating sleeve open to the exterior whereby said clamping screw may be manipulated from the exterior to clamp a terminal in said terminal sleeve, a sealing plug for engaging in the outer end of said insulating sleeve, and sealing means engaging said insulating sleeve and plug to seal said plug in place.

In witness whereof, I hereunto subscribe my name this 6th day of January A. D. 1908.

GEORGE M. WILLIS.

Witnesses:
CHARLES J. SCHMIDT,
FRED W. KOEHN.

Copies of this patent may be obtained for five cents each, by addressing the "Commissioner of Patents, Washington, D. C."